United States Patent [19]

Hansen et al.

[11] Patent Number: 5,412,032
[45] Date of Patent: May 2, 1995

[54] HIGH MOLECULAR WEIGHT LOW COUPLED LINEAR STYRENE-ISOPRENE-STYRENE BLOCK COPOLYMER COMPOSITION AND ADHESIVES MADE THEREFROM

[75] Inventors: David R. Hansen, Houston, Tex.; Steven H. Dillman, Bellingham, Wash.

[73] Assignee: Shell Oil Company, Houston, Tex.

[21] Appl. No.: 199,401

[22] Filed: Feb. 22, 1994

[51] Int. Cl.$^6$ .......................... C08L 9/06; C08L 53/02
[52] U.S. Cl. .......................................... 525/98; 525/95; 525/99
[58] Field of Search .............................. 525/98, 95, 99

[56] References Cited

U.S. PATENT DOCUMENTS

| | | |
|---|---|---|
| 3,519,585 | 7/1970 | Miller .................................. 260/27 |
| 3,681,190 | 8/1972 | Dahlquist ........................ 260/876 B |
| 3,783,072 | 1/1974 | Korpman ............................ 156/244 |
| 3,787,531 | 1/1974 | Dahlquist et al. ................. 206/59 C |
| 3,932,328 | 1/1976 | Korpman ........................ 260/27 BB |
| 3,972,848 | 8/1976 | Lakshmanan .................. 260/32.8 A |
| 3,984,509 | 10/1976 | Hall et al. .......................... 264/40.1 |
| 4,028,292 | 6/1977 | Korpman ........................ 260/27 BB |
| 4,080,348 | 3/1978 | Korpman ........................ 260/27 BB |
| 4,096,203 | 6/1978 | St. Clair .......................... 260/876 B |
| 4,136,071 | 1/1979 | Korpman ............................ 260/27 R |
| 4,622,357 | 11/1986 | Tsuchida et al. ..................... 524/270 |
| 4,734,447 | 3/1988 | Hattori et al. ....................... 524/271 |
| 4,785,043 | 11/1988 | Kawai et al. ........................ 524/272 |
| 5,093,406 | 3/1992 | Lossner et al. ..................... 524/483 |
| 5,118,762 | 6/1992 | Chin .................................. 525/314 |
| 5,149,741 | 9/1992 | Alper et al. ........................... 525/95 |

FOREIGN PATENT DOCUMENTS

| | | |
|---|---|---|
| 686721 | 5/1964 | Canada . |
| 0027606 | 4/1981 | European Pat. Off. . |
| 2432496 | 1/1976 | Germany . |
| 888624 | 1/1962 | United Kingdom . |
| 92/08763 | 5/1992 | WIPO . |

*Primary Examiner*—W. Robinson H. Clark
*Attorney, Agent, or Firm*—Donald F. Haas

[57] ABSTRACT

A linear styrene-isoprene-styrene block copolymer composition comprised of linear polymeric blocks wherein the block copolymer composition has a coupling efficiency of from 20 to 40%, a polystyrene content of from 18 to 24%, a polystyrene block molecular weight of from 25,000 to 35,000, and an overall molecular weight of above 280,000 to 520,000. The invention also contemplates adhesive formulations comprising these block copolymer compositions and a tackifying resin.

4 Claims, No Drawings

HIGH MOLECULAR WEIGHT LOW COUPLED LINEAR STYRENE-ISOPRENE-STYRENE BLOCK COPOLYMER COMPOSITION AND ADHESIVES MADE THEREFROM

BACKGROUND OF THE INVENTION

This invention relates to a novel block copolymer composition for use in adhesives. More particularly, it relates to high molecular weight low coupled linear styrene-isoprene-styrene block copolymer compositions comprised of linear polymeric blocks and adhesives made using such compositions.

It is known that a block copolymer can be obtained by an anionic copolymerization of a conjugated diene compound and an alkenyl arene compound by using an organic alkali metal initiator. Block copolymers have been produced which comprise primarily those having a general structure A-B and A-B-A wherein the polymer blocks A comprise thermoplastic polymer blocks of alkenyl arenes such as polystyrene, while block B is a polymer block of a conjugated diene such as polyisoprene. The proportion of the thermoplastic blocks to the elastomeric polymer block and the relative molecular weights of each of these blocks is balanced to obtain a rubber having unique performance characteristics. When the content of the alkenyl arene is small, the produced block copolymer is a so-called thermoplastic rubber. In such a rubber, the blocks A are thermodynamically incompatible with the blocks B resulting in a rubber consisting of two phases—a continuous elastomeric phase (blocks B) and a basically discontinuous hard, glass-like plastic phase (blocks A) called domains. Since the A-B-A block copolymers have two A blocks separated by a B block, domain formation results in effectively locking the B blocks and their inherent entanglements in place by the A blocks and forming a network structure.

These domains act as physical crosslinks anchoring the ends of many block copolymer chains. Such a phenomena allows the A-B-A rubber to behave like a conventional vulcanized rubber in the unvulcanized state and is applicable for various uses. For example, these network forming polymers are applicable for uses such as in adhesive formulations; as moldings of shoe soles, etc.; impact modifier for polystyrene resins and engineering thermoplastics; modification of asphalt; etc.

Different linear block copolymers exhibit different performances in adhesive formulations. Therefore, it requires some experimentation to determine the range of polymers which are useful for a particular adhesive application. For instance, it has been found that a linear S-I-S block polymer having a peak molecular weight as measured by gel permeation chromatography of 200 to 220, a polystyrene content of 20 to 25% and a coupling efficiency of 30 to 40% has good adhesive properties, especially peel strength but that its holding power in an adhesive composition could be advantageously increased for certain end uses such as labels with improved die cuttability, tapes, or adhesive bandages. Similarly, it has been found that a similar polymer with a coupling efficiency of 80 to 90% exhibits very good holding power but it would be advantageous to increase its peel strength so it would be more useful in the aforementioned end uses. The polymer and adhesive composition of the present invention provides the advantages of both of these types of polymers and eliminates their disadvantages.

SUMMARY OF THE INVENTION

The polymers which provide the above advantages and fall within the scope of the present invention are linear styrene-isoprene-styrene block copolymers which have a polystyrene content of from 18 to 24% by weight, a polystyrene block molecular weight of from 25,000 to 35,000, an overall molecular weight of above 280,000 up to 520,000 and a coupling efficiency of 20 to 40%, preferably 25 to 35%.

DETAILED DESCRIPTION OF THE INVENTION

As is well known, polymers containing both aromatic and ethylenic unsaturation can be prepared by copolymerizing one or more polyolefins, particularly a diolefin, in this case isoprene, with one or more alkenyl aromatic hydrocarbon monomers, in this case styrene. The copolymers may, of course, be random, tapered, block or a combination of these, in this case block. The blocks in the copolymers of this invention are linear.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as the present linear S-I-S block copolymer comprised of linear polymeric blocks are frequently prepared in solution using anionic polymerization techniques. In general, when solution anionic techniques are used, these S-I-S block copolymers are prepared by contacting the monomers to be polymerized simultaneously or sequentially with an organoalkali metal compound in a suitable solvent at a temperature within the range from about −150° C. to about 300° C., preferably at a temperature within the range from about 0° C. to 100° C. Particularly effective anionic polymerization initiators are organolithium compounds having the general formula:

RLi$_n$

Wherein:
R is an aliphatic, cycloaliphatic, aromatic or alkyl-substituted aromatic hydrocarbon radical having from 1 to about 20 carbon atoms; and n is an integer of 1 to 4.

The concentration of the initiator can be regulated to control the molecular weight of the overall composition and of the polystyrene blocks. Generally, the initiator concentration is in the range of about 0.25 to about 50 millimoles per 100 grams of monomer. The required initiator level frequently depends upon the solubility of the initiator in the hydrocarbon diluent. The ratio of the initiator to the monomer determines the block size, i.e. the higher the ratio of initiator to monomer the smaller the molecular weight of the block.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, tetrahydrofuran and the like.

As described in U.S. Pat. No. 4,096,203 the disclosure of which is herein incorporated by reference, usually the styrene is contacted with the initiator. Next, the living polymer in solution is contacted with isoprene. The resulting living polymer has a simplified structure A-B-Li. It is at this point that the living polymer is coupled.

There are a wide variety of coupling agents that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Various other substituents which are inert in the treating reaction can be present such as hydrocarbon radicals as exemplified by the alkyl, cycloalkyl, aryl, aralkyl and alkaryl groups and the alkoxy, aryloxy, alkythio, arylthio, and tertiary amino groups. Many suitable types of these polyfunctional compounds have been described in U.S. Pat. Nos. 3,595,941; 3,468,972; 3,135,716; 3,078,254, and 3,594,452, the disclosures of which are herein incorporated by reference. When the coupling agent has two reactive sites such as dibromoethane, the polymer will have a linear ABA structure. When the coupling agent has three or more reactive sites, such as silicon tetrachloride, the polymer will have a branched structure, such as (AB)$_n$BA. Since the present block copolymers are linear, a coupling agent with two reactive sites must be used.

In the prior art, such as that exemplified by U.S. Pat. Nos. 3,595,941 and 3,468,972, the disclosures of which are herein incorporated by reference, the effort was always made to select the particular coupling agent or reaction conditions that resulted in the highest coupling efficiency. Lower coupling efficiencies are desired herein in order to produce adhesive compositions which adhere strongly to difficult to adhere substances such as skin or polyolefins, e.g. polyethylene. Coupling efficiency is defined as the number of molecules of coupled polymer divided by the number of molecules of coupled polymer plus the number of molecules of uncoupled polymer. Thus, when producing an SIS linear polymer, the coupling efficiency is shown by the following relationship:

$$\frac{\text{\# of molecules of SIS}}{\text{\# of molecules of SIS plus SI}}$$

Coupling efficiency can be determined theoretically from the stoichiometric quantity of coupling agent required for complete coupling or coupling efficiency can be determined by an analytical method such as gel permeation chromatography. Typical prior art coupling efficiency is from about 80% to almost 100%. In U.S. Pat. No. 4,096,203, coupling efficiency is controlled from about 20% to about 80%, preferably about 30% to about 70%. It is also within the scope of the present invention to blend polymers from processes of differing coupling efficiency. For example, if a 60% efficiency is desired, then polymers from processes having an 80% efficiency and a 40% efficiency may be blended together or a 100% triblock may be blended with a 100% diblock in a 60:40 ratio.

This coupling efficiency is controlled by a number of methods. One method to reduce coupling efficiency is to add less than the stoichiometric amount of coupling agent required for complete coupling of the polymers. Another means of reducing coupling efficiency is by the premature addition of a terminator compound. These terminators, such as water or alcohol, respond very quickly and could easily be employed to cut short complete coupling of the polymers. In addition, by performing the coupling reaction at elevated temperatures, such as above about 190° F., thermal termination of many of the living polymer groups (A-B-Li) occurs prior to coupling. The typical coupling conditions include a temperature of between about 150° and about 170° F. and sufficient pressure to maintain the reactants in a liquid phase.

Following the coupling reaction or when the desired coupling efficiency has been obtained, the product is neutralized such as by the addition of terminators, e.g., hydrogen, water, alcohol or other reagents, for the purpose of terminating residual active anions. The product is then recovered such as by coagulation utilizing hot water or steam or both.

The polymer should have a polystyrene content of from 18 to 24% by weight because at lower styrene contents the polymers will exhibit lower shear properties and at higher than 24% styrene content these polymers are too stiff to perform as base polymers for pressure sensitive adhesives. The polymer may have a polystyrene block molecular weight of 25,000 to 35,000 because at greater than 35,000 the adhesive melt viscosity is too high. The polymer must have an overall molecular weight of greater than 280,000 up to 520,000 because at less than 280,000, the shear properties will not be sufficient and at greater than 520,000, the viscosity will be too high. The preferred range for the overall molecular weight is from 350,000 to 450,000. The coupling efficiency of the polymer must be in the range from 20 to 40%, preferably 25 to 35%, because at less than 20% coupling efficiency, the shear properties will be too low and at greater than 40%, the viscosity will be too high.

The molecular weights described herein are polystyrene equivalent molecular weights. Molecular weights of linear polymers or unassembled linear segments of polymers such as mono-, di-, triblock, and etc., arms of star polymers before coupling are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodisperse and it is both convenient and adequately descriptive to report the "peak" molecular weight of the narrow molecular weight distribution observed.

Methods of controlling the molecular weights of the blocks and the overall polymer are quite well known. For instance, such are disclosed in U.S. Pat. No. 3,149,182, which states that the amount of monomer can be kept constant and different molecular weights can be achieved by changing the amount of catalyst or the amount of catalyst can be kept constant and different molecular weights can be achieved by varying the amount of the monomer, and in U.S. Pat. No. 3,231,635, the disclosures of which are herein incorporated by reference, and many others. A typical block copolymer composition within the scope of the present invention, having a coupling efficiency of 36%, polystyrene block molecular weight of 29,000, a polystyrene content of 22% and an overall molecular weight of 391,000, was prepared by polymerizing styrene with sec-butyl lithium as initiator at a monomer to initiator molar ratio of 278 to 1 at 70° C. and then terminating the polymerization, polymerizing isoprene at a monomer to initiator molar ratio of 1512 to 1 at 70° C. and then terminating the polymerization and finally coupling the diblock with dibromoethane at 70° C. for ½ hour.

It is necessary to add an adhesion promoting or tackifying resin that is compatible with the elastomeric conjugated diene block. A common tackifying resin is a diene-olefin copolymer of piperylene and 2-methyl-2-butene having a softening point of about 95° C. This resin is available commercially under the tradename Wingtack 95 and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C. and about 115° C.

Other adhesions promoting resins which are also useful in the compositions of this invention include hydrogenated rosins, esters of rosins, polyterpenes, terpenephenol resins and polymerized mixed olefins. To obtain good thermo-oxidative and color stability, it is preferred that the tackifying resin be a saturated resin, e.g., a hydrogenated dicyclopentadiene resin such as Escorez ® 5000 series resin made by Exxon or a hydrogenated polystyrene or polyalphamethylstyrene resin such as Regalrez ® resin made by Hercules.

The amount of adhesion promoting resin employed varies from about 20 to about 400 parts by weight per hundred parts rubber (phr), preferably between about 100 to about 350 phr.

The selection of the particular tackifying agent is, in large part, dependent upon the specific block copolymer employed in the respective adhesive composition. In the manufacture of disposable articles such as diapers, sanitary napkins and bed pads, there is the additional consideration of having a substantially white or clear adhesive composition.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo ® 6056 oil made by Arco. The amounts of rubber compounding oil employed in the invention composition can vary from 0 to about 100 phr, and preferably between about 0 to about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Addition stabilizers known in the art may also be incorporated into the adhesive composition. These may be for protection during the life of the disposable article against, for example, oxygen, ozone and ultra-violet radiation. However, these additional stabilizers should be compatible with the essential stabilizers mentioned herein-above and their intended function as taught herein.

The adhesive compositions of the present invention are typically prepared by blending the components at an elevated temperature, preferably between about 130° C. and about 200° C., until a homogeneous blend is obtained, usually less than three (3) hours. Various method of blending are known to the art and any method that produces a homogeneous blend is satisfactory.

The preferred use for these compositions is in pressure sensitive adhesives. However, it is useful in other applications such as sealants, modified asphalts, and contact adhesives.

EXAMPLES

The following experiments compare and contrast a polymer which falls within the scope of the present invention, Polymer A, and Polymer B which is presently used commercially for pressure sensitive adhesive applications for which the polymers of the present invention are especially suitable. Table 1 below gives the specifications of these two polymers.

TABLE 1

| Polymer | A | B |
| --- | --- | --- |
| Total Mol. Wt. (Ms) | 391,000 | 201,000 |
| PS Block Mol. Wt., (Ms) | 29,000 | 15,000 |
| Coupling Efficiency, % | 36 | 82 |
| Polystyrene Content, % | 22 | 22 |

The above polymers were tested in two different pressure sensitive formulations. Formulation 2 utilizes less polymer and more oil. These formulations are set forth in Table 2 below.

TABLE 2

| Formulation | 1 | 2 |
| --- | --- | --- |
| Polymer | 100 | 100 |
| Wingtack 95 resin | 100 | 165 |
| Shellflex 371 oil | 10 | 27 |
| Irganox 1010 stabilizer | 1 | 1 |

The formulations were dissolved in toluene and 40 percent solids and casted onto Mylar ® films at 1.5 mil thick. Pressure sensitive tests were run on the films. In addition, hot melt and solution viscosities were measured. Table 3 and 4 show the test results.

TABLE 3

| | Pressure Sensitive Tests | | | |
|---|---|---|---|---|
| | FORMULATION 1 | | FORMULATION 2 | |
| Test | Polymer A | Polymer B | Polymer A | Polymer B |
| RBT, cm | 2.4 | 1.3 | 20.4 | 5.7 |
| PPT, kg | .82 | 1.12 | .96 | .96 |
| LOOP TACK, oz/in | 96 | 89 | 143 | 137.5 |
| 180 PEEL/PE, pli | 5.3 | 4.2 | 8.1 | 5.3 |
| HP/PE[3], min | 3782 | >11300 | 4150 | 2355 |
| HP/KRAFT[3], min | 940.25 | >13000 | 33.3 | 540.2 |
| HP/STEEL[3], min | 10719 | >13000 | 2642 | 4154 |
| SAFT/KRAFT[4], °C. | 75 | 73 | 56 | 42 |
| SAFT/MYLAR[4], °C. | 111 | 111.5 | 95 | 82 |

[1] 48% polymer in formulation
[2] 34% polymer in formulation
[3] .5" × 5" sample size, 2 kg wt.
[4] 1" × 1" sample size, 1 kg wt.

TABLE 4

| Toluene Solution[5] | 25% Polymer |
|---|---|
| Polymer A | 2835 |
| Polymer B | 1200 |

[5] Toluene solution viscosity run at 25° C. in toluene with #21 spindle Brookfield The results show that Polymer A is comparable to commercially used Polymer B for most of the tests. The holding powers for Polymer A were generally lower (especially for Formulation A with the higher polymer loading) but were satisfactory for most applications. The strength test (SAFT—shear adhesion failure temperature) show that the Polymer A is slightly better than Polymer B in both adhesive formulations. Significantly, the peel values for the Polymer A adhesives were higher than those of the Polymer B adhesives. The high toluene viscosities shown in Table 4 are due to the high molecular weight of the polymer. However, because of the low coupling efficiency, the viscosities are still very reasonable for solution coating applications.

The SAFT (shear adhesion failure temperature) was measured by 1"×1" Mylar to Mylar lap joint with a 1 kg weight. SAFT measures the temperature at which the lap shear assembly fails under load (the temperature is increased 40° F. per hour). Rolling Ball Tack (RBT) is the distance a steel ball rolls on the adhesive film with a standard initial velocity (Pressure Sensitive Tape Council Test No. 6). Small numbers indicate aggressive tack. Holding Power (HP) is the time required to pull a standard area (½ in.×½ in.) of tape from a standard test surface (steel, Kraft paper) under a standard load (2 kg), in shear at 2° antipeel (Pressure Sensitive Tape Council Method No. 7) long times indicate high adhesive strength. 180° peel was determined by Pressure Sensitive Tape Council Method No. 1. Large numbers indicate high strength when peeling a test tape from a steel substrate. Polyken probe tack (PPT) was determined by ASTM D-2979. Loop tack (LT) was determined using TLMI loop tack tester. High numbers for PPT and LT indicate aggressive tack.

We claim:

1. A linear styrene-isoprene-styrene block copolymer composition comprised of linear polymeric blocks, said block polymer composition characterized in that it has a coupling efficiency from 20 to 40%, a polystyrene content of from 18 to 24% by weight, a polystyrene block peak molecular weight as determined by gel permeation chromatography of from 25,000 to 35,000, and an overall peak molecular weight as determined by gel permeation chromatography of from above 280,000 to 520,000.

2. A hot melt adhesive consisting essentially of the block copolymer composition of claim 1 and a tackifying resin.

3. The block copolymer composition of claim 1 wherein the coupling efficiency ranges from 25 to 35% and the overall peak molecular weight as determined by gel permeation chromatography ranges from 350,000 to 450,000.

4. A hot melt adhesive consisting essentially of the block copolymer composition of claim 3 and a tackifying resin.

* * * * *